US012706313B2

(12) United States Patent
Lee et al.

(10) Patent No.: US 12,706,313 B2
(45) Date of Patent: Aug. 11, 2026

(54) METHOD FOR PREPARING SILICON ANODE ACTIVE MATERIAL IN WHICH NANO-SILICON MIXTURE IS INSERTED INTO PORES OF COFFEE GROUNDS

(71) Applicant: MAGNATECH CO., LTD., Jeollanam-do (KR)

(72) Inventors: Jin-Pyo Lee, Daejeon (KR); Jun-Pyo Park, Gwangju (KR)

(73) Assignee: MAGNATECH CO., LTD., Jangseong-gun (KR)

( * ) Notice: Subject to any disclaimer, the term of this patent is extended or adjusted under 35 U.S.C. 154(b) by 487 days.

(21) Appl. No.: 18/137,512

(22) Filed: Apr. 21, 2023

(65) Prior Publication Data

US 2023/0343964 A1 Oct. 26, 2023

(30) Foreign Application Priority Data

Apr. 21, 2022 (KR) ........................ 10-2022-0049672
Dec. 26, 2022 (KR) ........................ 10-2022-0184687

(51) Int. Cl.
*H01M 4/62* (2006.01)
*H01M 4/02* (2006.01)
(Continued)

(52) U.S. Cl.
CPC ........... *H01M 4/628* (2013.01); *H01M 4/362* (2013.01); *H01M 4/386* (2013.01); *H01M 2004/027* (2013.01)

(58) Field of Classification Search
CPC ...... H01M 4/628; H01M 4/587; H01M 4/386; H01M 4/1393; H01M 4/134; H01M 4/1395; H01M 10/052; C01B 32/20; C01B 32/05
(Continued)

(56) References Cited

FOREIGN PATENT DOCUMENTS

CN 103320888 A * 9/2013
CN 113353911 A * 9/2021 ........ H01M 10/0525
(Continued)

OTHER PUBLICATIONS

Translation of CN-103320888-A (Year: 2013).*
(Continued)

*Primary Examiner* — Tri V Nguyen
(74) *Attorney, Agent, or Firm* — Akerman LLP

(57) ABSTRACT

A method for preparing a silicon anode active material in which a nano-silicon mixture is inserted into pores of coffee grounds according to the present disclosure can contribute to the protection of the natural environment through the preparation of a high-capacity silicon anode active material for a lithium secondary battery, which is prepared using coffee grounds that are an environmental pollutant, and has an effect of lowering the preparation cost of a lithium secondary battery anode material with the high-capacity silicon anode active material using coffee grounds by including the steps of: a) preparing nano-silicon; b) preparing an anionic surfactant; c) preparing silane; d) preparing a mixed dispersion based on ultrapure distilled water; e) drying and preparing coffee grounds; f) mixing polyvinyl alcohol into a mixed dispersion; g) mixing polyamic acid into the mixed dispersion; h) mixing graphite into the mixed dispersion; i) mixing vegetable oil into the mixed dispersion; j) final mixed dispersion heat treatment process step; k) obtaining a silicon active material of a certain size using an ultrasonic vibrating screen; l) obtaining a silicon anode active material final product by inserting nano-silicon into the pores of the coffee grounds; and m) obtaining a silicon anode active material in which a nano-silicon mixture ($SiO_2$, SiC) is inserted into the pores of the coffee grounds.

14 Claims, 7 Drawing Sheets

(51) Int. Cl.
*H01M 4/36* (2006.01)
*H01M 4/38* (2006.01)

(58) Field of Classification Search
USPC .................................................... 252/182.1
See application file for complete search history.

(56) References Cited

FOREIGN PATENT DOCUMENTS

| | | | | | |
|---|---|---|---|---|---|
| KR | 20180024922 | A | * | 3/2018 | ............ H01M 4/362 |
| KR | 101898110 | B1 | | 9/2018 | |
| KR | 1020190143661 | A | | 12/2019 | |
| KR | 1020210121590 | A | | 10/2021 | |
| KR | 102334001 | B1 | | 12/2021 | |

OTHER PUBLICATIONS

Translation of CN-113353911-A (Year: 2021).*
Llu Biowaste-derived Si@SiO x /C anodes for sustainable lithium-ion batteries. Electrochimica Acta 403 (2022) 139580 (Year: 2022).*
Translation of KR20180024922A1 (Year: 2018).*
Notice of Allowance issued Sep. 15, 2022 in connection with Korean Patent Application No. 10-2022-0049672.

* cited by examiner

[FIG. 1]
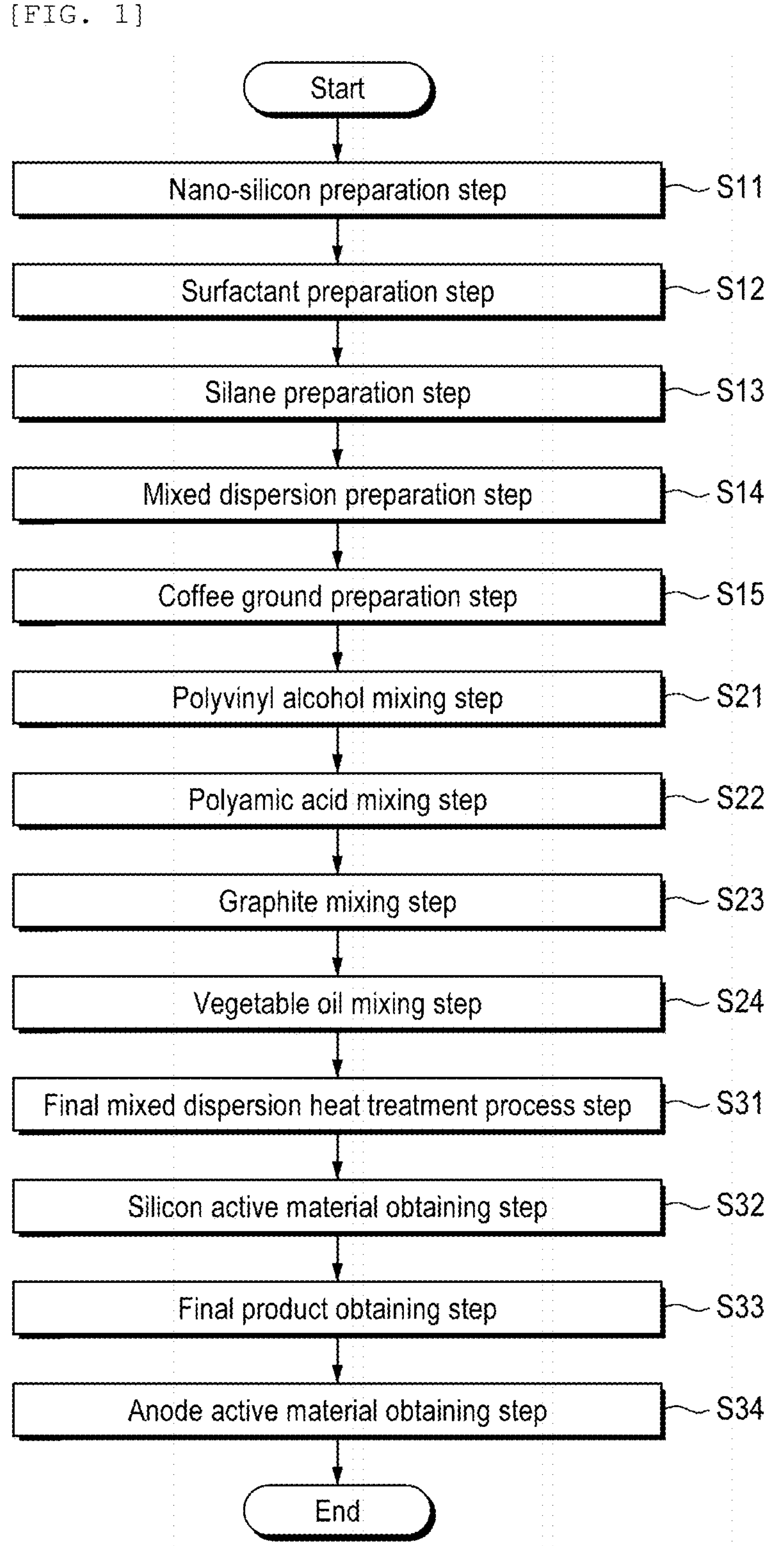

[FIG. 2]
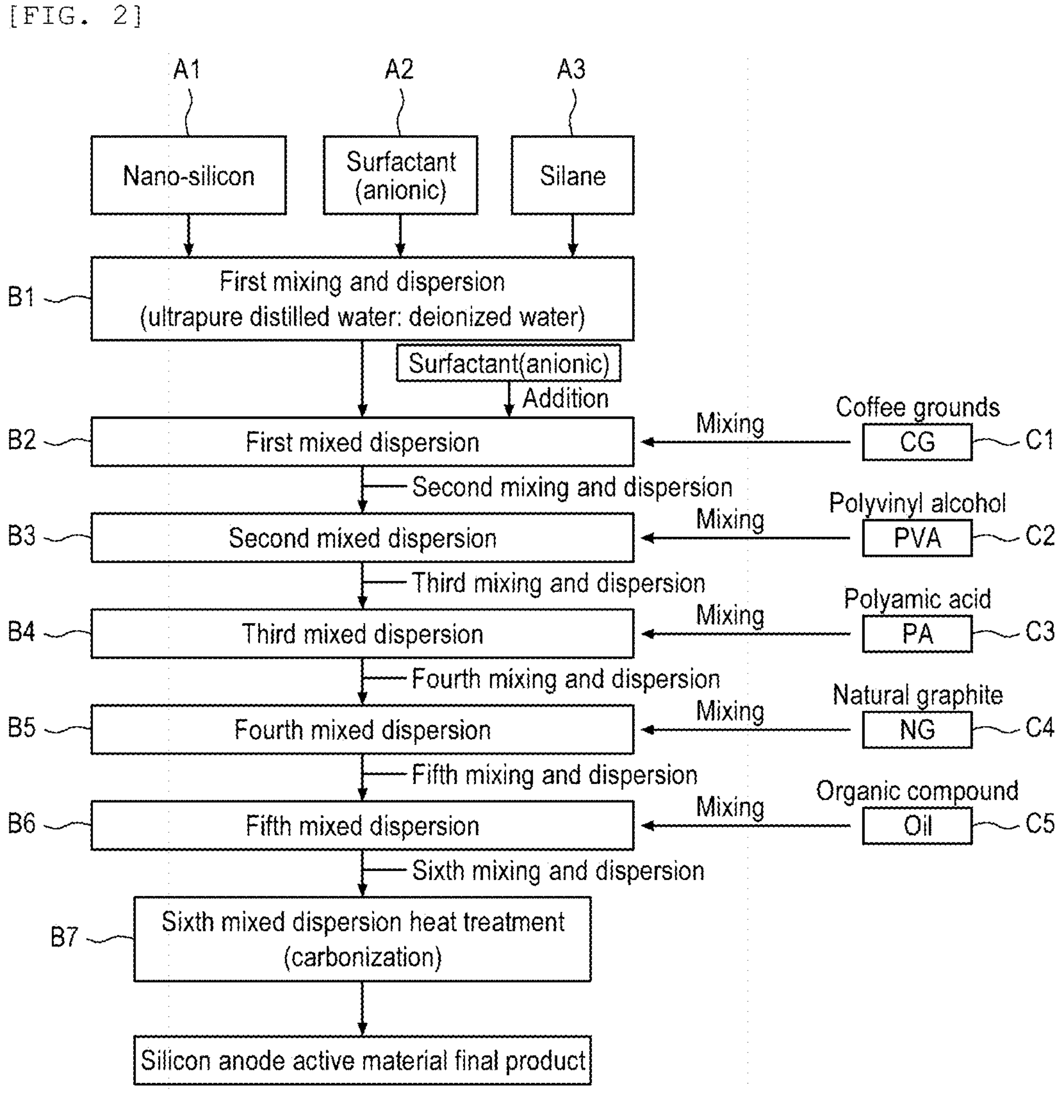

[FIG. 3]
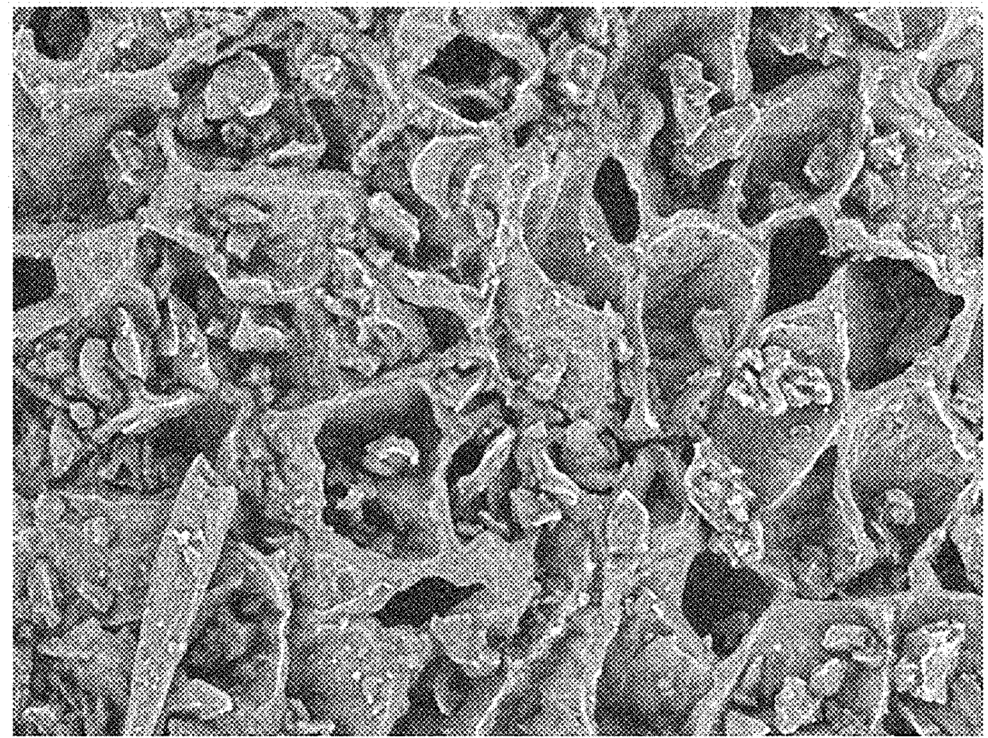
[FIG. 4]
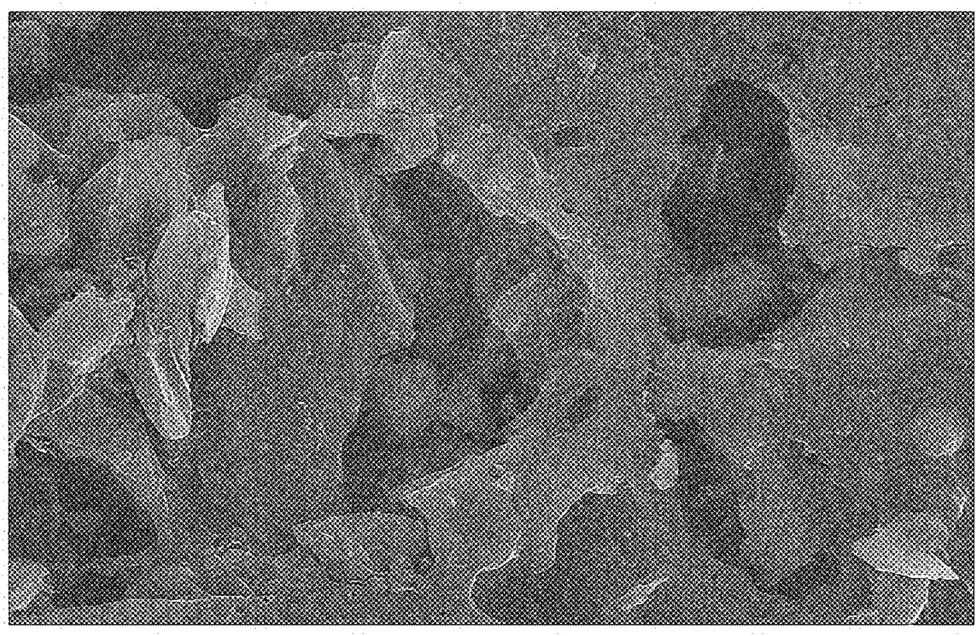

[FIG. 5A]
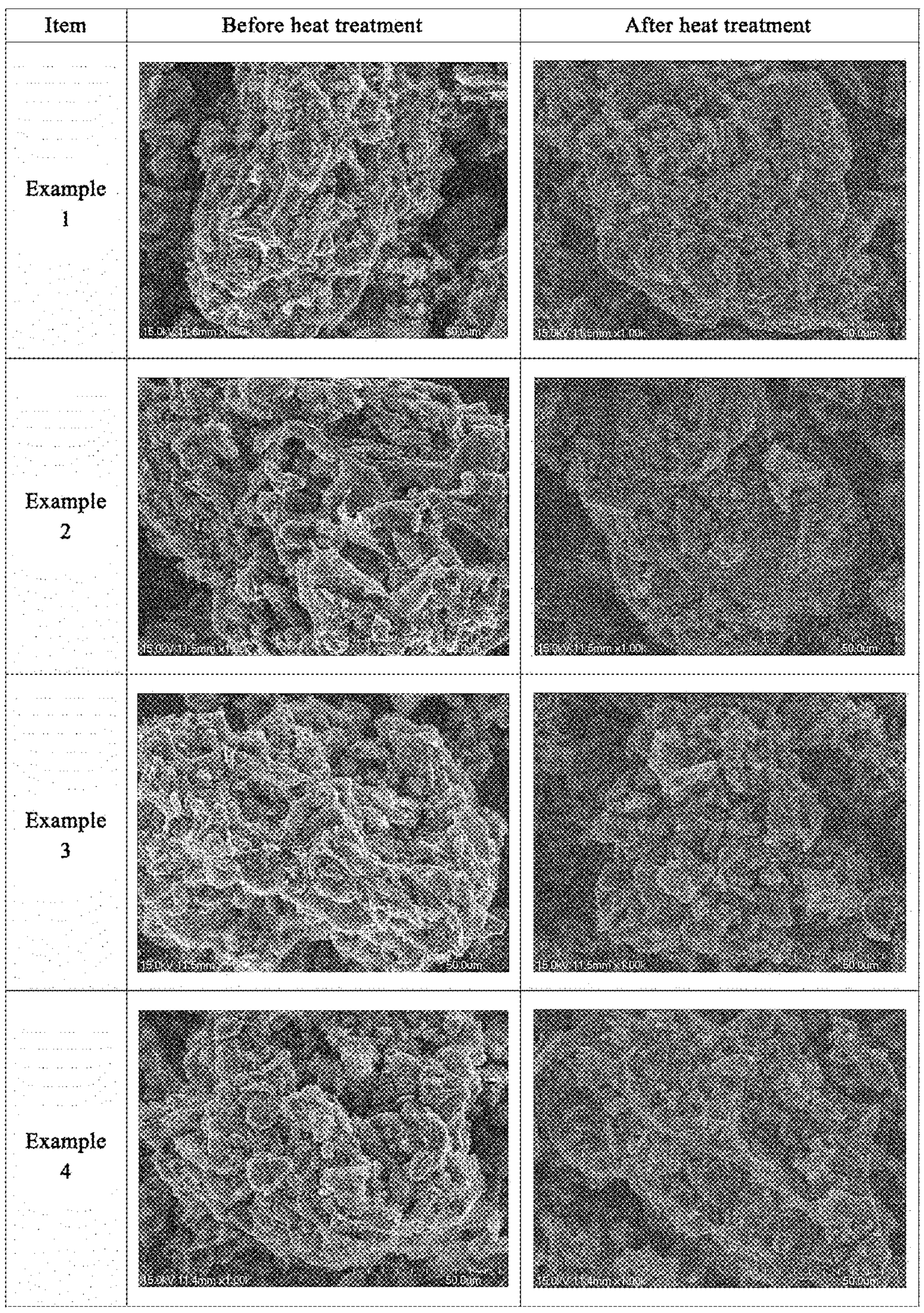

[FIG. 5B]
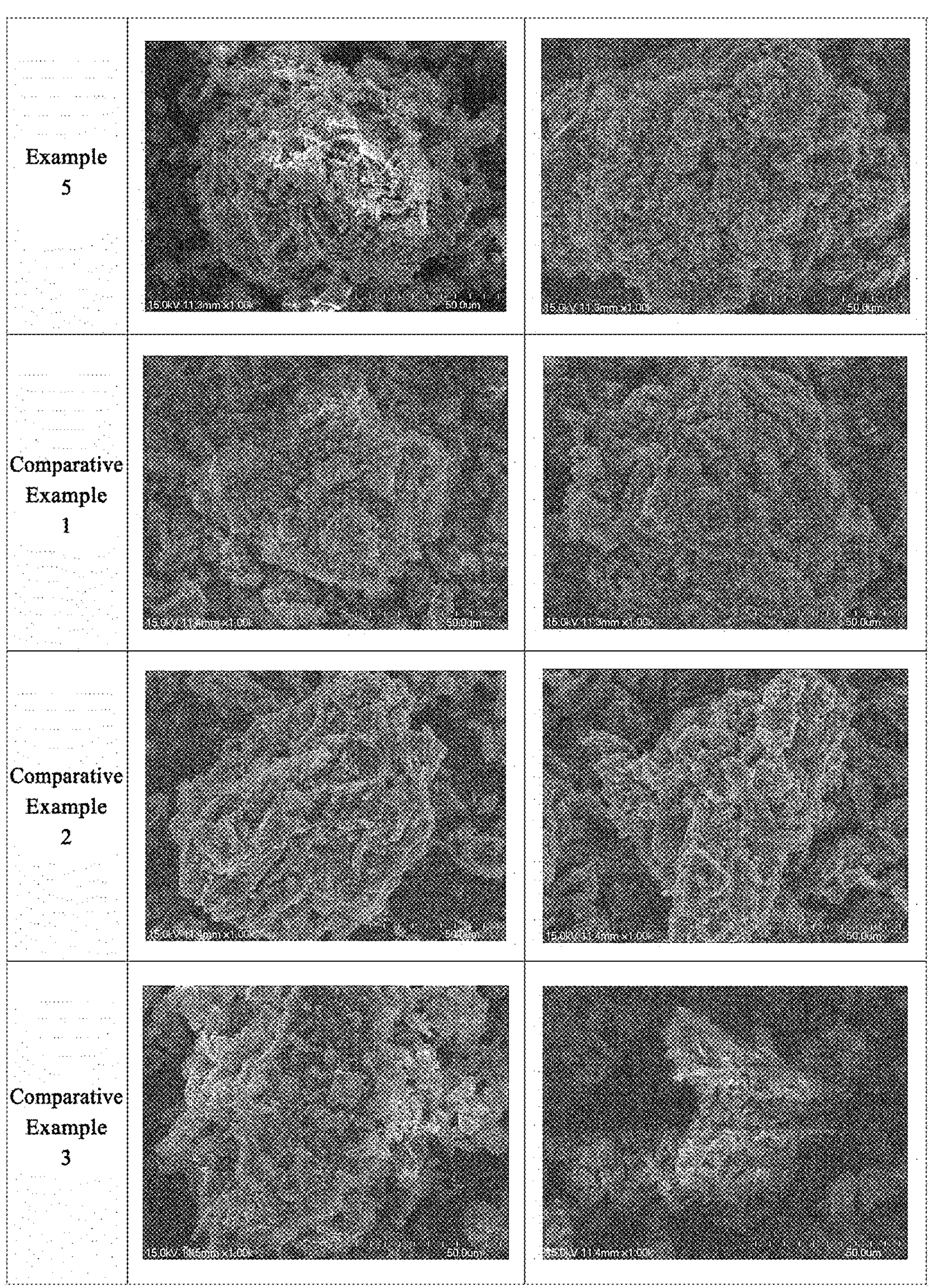

[FIG. 6]
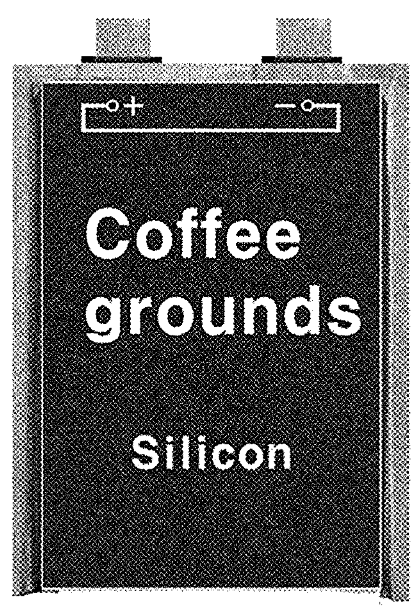
[FIG. 7]
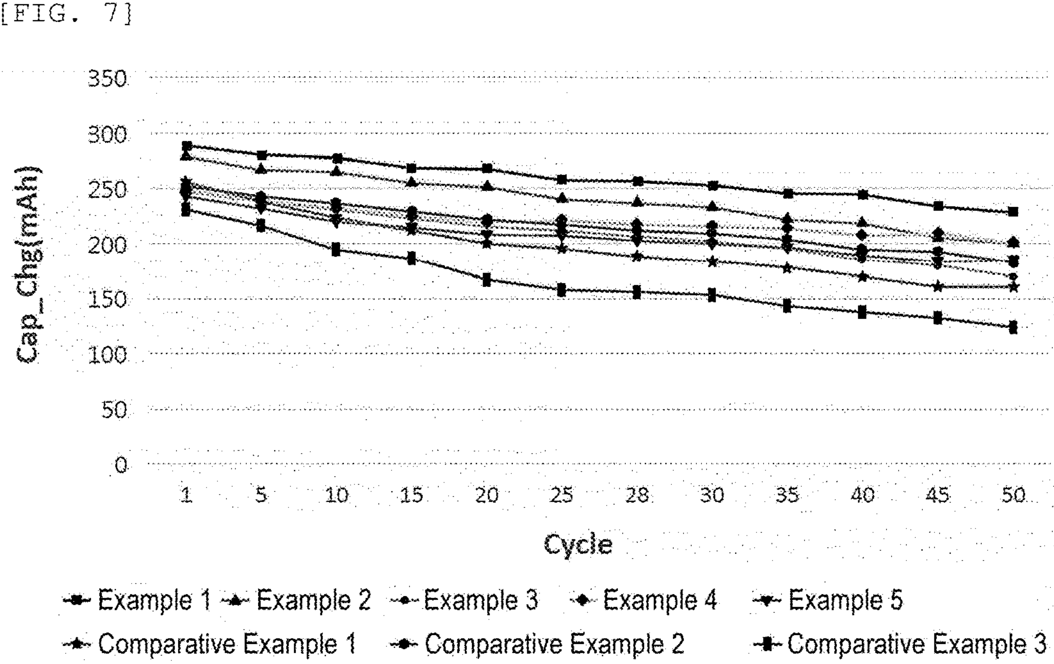

[FIG. 8]
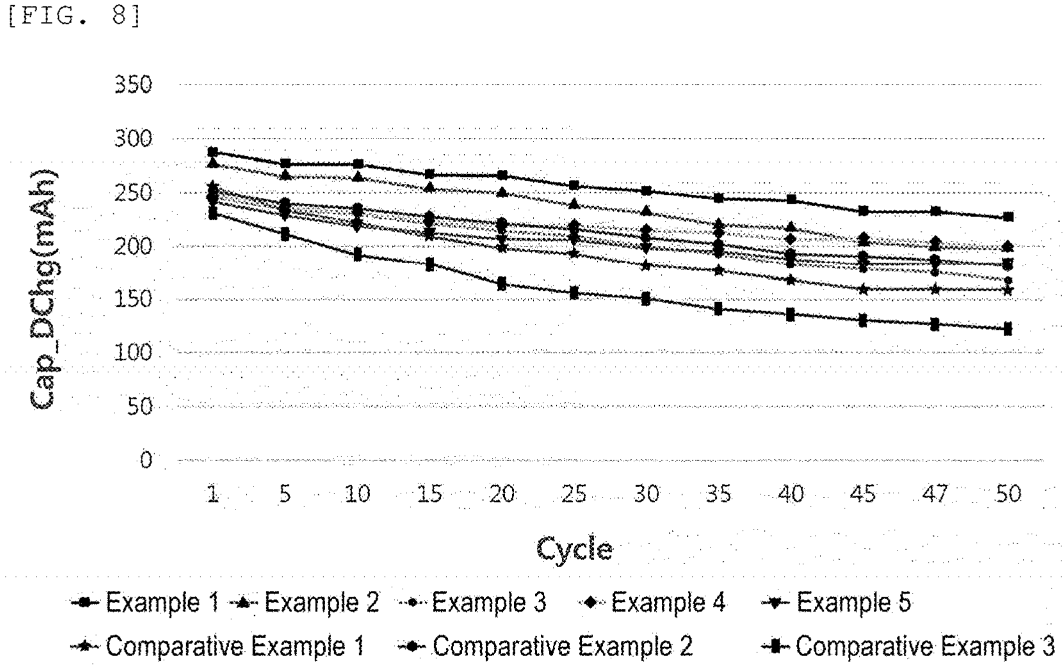

METHOD FOR PREPARING SILICON ANODE ACTIVE MATERIAL IN WHICH NANO-SILICON MIXTURE IS INSERTED INTO PORES OF COFFEE GROUNDS

CROSS-REFERENCE TO RELATED APPLICATIONS

This application claims priority and benefit of Korean Patent Application Nos. 10-2022-0049672 filed on Apr. 21, 2022, and 10-2022-0184687, filed on Dec. 26, 2022, in the Korean Intellectual Property Office, the disclosures of which are incorporated herein by reference.

BACKGROUND

Field

The present disclosure relates to a method for preparing a silicon anode active material in which a nano-silicon mixture is inserted into pores of coffee grounds, and more particularly, to a method for preparing a silicon anode active material in which a nano-silicon mixture is inserted into the pores of the coffee grounds, the method capable of suppressing a silicon crushing and peeling phenomenon due to volume expansion daring charging and discharging by inserting nano-silicon into the pores of collected coffee grounds without an activated carbonization process of creating a porous structure of coffee grounds.

DESCRIPTION OF THE RELATED ART

Recently, technically in the secondary battery market, technologies of four major materials (cathode material, anode material, separator, electrolyte) for improving the mileage, lifespan, charging speed, and the like of electric vehicles are being advanced, and there is a trend of more strengthening independent technical standards according to the establishment of an electric vehicle platform.

In addition, the development of materials with higher capacities and higher energy densities while being more stable than existing secondary batteries is being accelerated.

Here, silicon, a high-performance material, is an anode material with a theoretical capacity (4,200 mAh/g) 10 times higher than that of graphite, but it is also a material that has many problems during charging and discharging.

Problems during charging and discharging of the silicon anode active material may be largely divided into three categories. First, about 400% volume change of the silicon anode active material causes cracks in the outer silicon particles so that performance degradation occurs. Second, as the conductive path between silicon and graphite is broken, peeling phenomenon occurs. Third, when silicon and graphite are synthesized and used, since charging during synthesis causes volume expansion to the extent of destroying the SEI layer, lithium is consumed, and gas is generated.

Such a method of alleviating volume expansion may be improved by inserting silicon into the pores of the coffee grounds and carbonizing them, and may have an improvement effect such as an increase in electrical conductivity and capacity due to carbonization.

In general, the anode active material is prepared by a method of inserting silicon into coffee grounds through an activated carbonization process, but this method has a disadvantage in that it should be divided into several processes.

Therefore, it is urgent to develop a technology capable of lowering the preparation cost according to process reduction due to nano-silicon insertion being performed in the process of mixing and stirring dispersed nano-silicon and coffee grounds without a separate activated carbon preparation process.

SUMMARY

Therefore, the present disclosure has been made to solve the above problems, and relates to a method for preparing a silicon anode active material, and more particularly, it is an object of the present disclosure to provide a method for preparing a silicon anode active material in which a nano-silicon mixture is inserted into the pores of coffee grounds, the method capable of suppressing a silicon crushing and peeling phenomenon due to volume expansion during charging and discharging by inserting nano-silicon into the pores of collected coffee grounds without an activated carbonization process of creating a porous structure of coffee grounds.

However, the technical task to be achieved in the present disclosure is not limited to the above-mentioned technical tasks, and another technical tasks not mentioned will be able to be clearly understood by those skilled in the art to which the present disclosure belongs from the description below.

A method for preparing a silicon anode active material in which a nano-silicon mixture is inserted into pores of coffee grounds according to the present disclosure, which is a technical means for achieving the object described above, may include the steps of: a) preparing nano-silicon; b) preparing an anionic surfactant; c) preparing silane; d) preparing a mixed dispersion based on ultrapure distilled water; e) drying and preparing coffee grounds; f) mixing polyvinyl alcohol into a mixed dispersion; g) mixing polyamic acid into the mixed dispersion; h) mixing graphite into the mixed dispersion; i) mixing vegetable oil into the mixed dispersion; j) final mixed dispersion heat treatment process step; k) obtaining a silicon active material of a certain size using an ultrasonic vibrating screen; l) obtaining a silicon anode active material final product by inserting nano-silicon into the pores of the coffee grounds; and m) obtaining a silicon anode active material in which a nano-silicon mixture ($SiO_2$, SiC) is inserted into the pores of the coffee grounds.

In addition, the step a) may include the steps of: a-1) preparing silicon dioxide by drying a mixture in an amount of 1 to 0.68% by weight of the total 100% by weight of ultrapure distilled water at 100 to 130° C.; a-2) preparing silicon carbide by drying a mixture in an amount of 1 to 0.26% by weight of the total 100% by weight of ultrapure distilled water at 100 to 130° C.; and a-3) drying silicon to remove moisture contained in silicon.

In addition, in the step b), an anionic surfactant in which anions generated by dissociation in water are adsorbed on the surface of the aqueous solution to lower the surface tension is any one component of sodium lauryl ether sulfate, sodium α-olefin sulfonate, and alhyldimethylamine oxide, and may be used in a mixing amount of 1 to 7.5% by weight of the total 100% by weight of ultrapure distilled water.

In addition, in the step c), alkoxysilane(methyltrimethothysilane: (CH3O)3SiCH3) used to allow the inorganic surface to have hydrophobic properties may be used in a mixing amount of 1 to 6.25% by weight of the total 100% by weight of ultrapure distilled water.

In the step d), nano-silicon, an anionic surfactant, silane, coffee grounds, polyvinyl alcohol, polyamic acid, graphite, and vegetable oil may be mixed and dispersed in ultrapure distilled water (deionzed water).

In addition, the step e) is a step of preparing the coffee grounds by drying it at 130° C., and the coffee grounds are used in a mixing amount of 10 to 3.66% by weight of the total 100% by weight of ultrapure distilled water, and there may be no water washing process in the entire process ranging from the collection to the anode active material final product since the coffee grounds used in the above process do not go through the activated carbonization process by performing heat treatment after the processes of immersing the coffee grounds a hydroxide solution (potassium hydroxide: KOH, sodium hydroxide: NaOH, calcium hydroxide: $Ca(OH)_2$) in order to obtain a plurality of pores and removing the hydroxide solution from the coffee grounds.

In addition, in the step f), polyvinyl alcohol described above may be mixed in an amount of 1 to 0.5% by weight of the total 100% by weight of an ultrapure water mixed solution.

In addition, in the step g), polyamic acid described above may be mixed in an amount of 1 to 1.37% by weight of the total 100% by weight of the ultrapure distilled water mixed solution.

In addition, in the step h), graphite described above is natural graphite, and may be mixed in an amount of 1 to 15% by weight of the total 100% by weight of the ultrapure distilled water mixed solution.

In addition, in the step i), vegetable oil described above may be mixed in an amount of 1 to 7.5% by weight of the total 100% by weight of the ultrapure distilled water mixed solution.

In addition, the step j) is a sixth mixed dispersion final heat treatment process, and may include the steps of: j-1) primarily performing drying at 300 to 380° C.; and j-2) secondly performing heat treatment at 800 to 900° C.

In addition, in the step k), the aforementioned coffee grounds in which nano-silicon and graphite are mixed are pulverized with an automatic grinding mill and screened with an ultrasonic vibrating screen sieve so that a coffee ground nano-silicon anode active material composite capable of being used as an anode material may be obtained.

Meanwhile, the present disclosure provides a silicon anode active material in which a nano-silicon mixture is inserted into pores of coffee grounds, which is prepared by the preparation method including the steps of: a) preparing nano-silicon; b) preparing an anionic surfactant; c) preparing silane; d) preparing a mind dispersion based on ultrapure distilled water; e) drying and preparing coffee grounds; f) mixing polyvinyl alcohol into a mixed dispersion; g) mixing polyamic acid into the mixed dispersion; h) mixing graphite into the mixed dispersion; i) mixing vegetable oil into the mixed dispersion; j) final mixed dispersion heat treatment process step; k) obtaining a silicon active material of a certain size using an ultrasonic vibrating screen; l) obtaining a silicon anode active material final product by inserting nano-silicon into the pores of the coffee grounds; and m) obtaining a silicon anode active material in which a nano-silicon mixture ($SiO_2$, SiC) is inserted into the pores of the coffee grounds, in the silicon anode active material in which a nano-silicon mixture is inserted into pores of coffee grounds.

In addition, the present disclosure provides lithium secondary battery anode including the anode active material.

In addition, the present disclosure provides a lithium secondary battery including the lithium secondary battery anode.

BRIEF DESCRIPTION OF THE DRAWINGS

FIG. 1 is a flow chart showing a method for preparing a silicon anode active material in which a nano-silicon mixture is inserted into pores of coffee grounds according to an embodiment of the present disclosure.

FIG. 2 is a flow chart showing the silicon anode active material in which a nano-silicon mixture is inserted into pores of coffee grounds according to FIG. 1 and a preparation method thereof.

FIG. 3 is an SEM image showing coffee grounds collected from coffee shops.

FIG. 4 is an SEM image showing the insertion of nano silicon into coffee ground macropores and micropores.

FIG. 5 is SEM images before and after heat treatment of a silicon anode active material in which a nano-silicon mixture is inserted into pores of coffee grounds.

FIG. 6 is an example image of a battery for testing manufactured using the silicon anode active material according to the present disclosure.

FIGS. 7 and 8 are graphs showing charge and discharge characteristics of silicon active material testing batteries.

DETAILED DESCRIPTION OF THE PREFERRED EMBODIMENT

Hereinafter, embodiments of the present disclosure will be described in detail so that those skilled in the art to which the present disclosure pertains can easily carry out the present disclosure with reference to the accompanying drawings. However, since the description of the present disclosure is only an embodiment for structural or functional description, the scope of rights of the present disclosure should not be construed as being limited by the embodiments described in the text. That is, since the embodiment can be changed in various ways and can have various forms, it should be understood that the scope of rights of the present disclosure includes equivalents capable of realizing the technical idea. In addition, since the object or effect presented in the present disclosure does not mean that a specific embodiment should include all of them or only such an effect, the scope of rights of the present disclosure should not be construed as being limited thereby.

The meaning of terms described in the present disclosure should be understood as follows.

Terms such as “first” and “second” refer to one for distinguishing one element from another element, and the scope of rights should not be limited by these terms. For example, a first element may be termed a second element, and similarly, a second element may be termed a first element. When an element is referred to as “connected” to another element, it should be understood that the element may be directly connected to the other element, but another element may exist in the middle thereof. On the other hand, when an element is referred to as being “directly connected” to another element, it should be understood that another element does not exist in the middle thereof. Meanwhile, other expressions describing the relationship between elements, such as “between” and “directly between” or “neighboring to” and “directly neighboring to” should be interpreted similarly.

A singular expression should be understood to include a plurality of expressions unless the context clearly indicates otherwise, terms such as “comprise”, “have”, or the like are intended to designate that an installed feature, number, step, operation, component, part, or combination thereof is present, and it should be understood that the possibility of presence or addition of one or more other features, numbers, steps, operations, components, parts, or combinations thereof is not precluded.

All terms used herein, unless otherwise defined, have the same meaning as commonly understood by those skilled in the art to which the present disclosure pertains. Terms defined in commonly used dictionaries should be interpreted as consistent with meanings in the context of the related art, and cannot be interpreted as having ideal or excessively formal meanings unless explicitly defined in the present disclosure.

FIG. 1 is a flow chart showing a method for preparing a silicon anode active material in which a nano-silicon mixture is inserted into pores of coffee grounds according to an embodiment of the present disclosure, FIG. 2 is a flow chart showing the silicon anode active material in which a nano-silicon mixture is inserted into pores of coffee grounds according to FIG. 1 and a preparation method thereof, FIG. 3 is an SEM image showing coffee grounds collected from coffee shops, FIG. 4 is an SEM image showing the insertion of nano-silicon into coffee ground micropores and micropores, FIG. 5 is SEM images before and after heat treatment of a silicon anode active material in which a nano-silicon mixture is inserted into pores of coffee grounds, FIG. 6 is an example image of a battery for testing manufactured using the silicon anode active material according to the present disclosure, and FIGS. 7 and 8 are graphs showing charge and discharge characteristics of silicon active material testing batteries.

Anode Active Material and Preparation Method Thereof

As shown in FIG. 1, a method for preparing a silicon anode active material in which a nano-silicon mixture is inserted into coffee ground pores, according to the present disclosure, may be configured to include a nano-silicon preparation step (S11) of preparing nano-silicon, a surfactant preparation step (S12) of preparing an anion surfactant, a silane preparation step (S13) of preparing silane, a mixed dispersion preparation step (S14) of preparing a mixed dispersion based on ultrapure distilled water, a coffee ground preparation step (S15) of drying coffee grounds to prepare the coffee grounds, a polyvinyl alcohol mixing step (S21) of mixing polyvinyl alcohol with the mixed dispersion, a polyamic acid mixing step (S22) of mixing polyamic acid with the mixed dispersion, a graphite mixing step (S23) of mixing graphite with the mixed dispersion, a vegetable oil mixing step (S24) of mixing vegetable oil with the mixed dispersion, a final mixed dispersion heat treatment process step (S31), a silicon active material obtaining step (S32) of obtaining a silicon active material of a certain size with an ultrasonic vibrating screen, a final product obtaining step (S33) of inserting nano-silicon into the coffee Ground pores to obtain a silicon anode active material final product, and an anode active material obtaining step (S34) of obtaining a silicon anode active material in which a nano-silicon mixture ($SiO_2$, SiC) is inserted into the coffee ground pores.

As an example of a means for carrying out such a method for preparing the silicon anode active material, nano-silicon may be composed of one or more silicon selected from the group consisting of silicon (Si), silicon dioxide (silica, $SiO_2$), and silicon carbide (SiC), the size thereof may be most preferably 20 to 100 nm considering the miscibility with other components, or the like, and nano-silicon may be preferably contained in mixing amounts of 0.5 to 4% by weight of silicon dioxide ($SiO_2$) and 0.2 to 1.3% by weight of silicon carbide (SiC) based on the total weight.

In addition, the surfactant may be composed of one or more selected from the group consisting of anionic surfactants, cationic surfactants, nonionic surfactants, amphoteric surfactants, and special surfactants, and the surfactant is preferably an anionic surfactant considering the synergistic action with other components, and is preferably contained in mixing amounts of 1 to 9% by weight of a primary anionic surfactant and 7 to 8% by weight of a secondary anionic surfactant based on the total weight.

In addition, silane may be composed of one or more selected from the group consisting of chlorosilane, alkoxysilane, and silazane, and silane is most preferably alkoxysilane(methyltrimethoxysilane: (CH3O)3SiCH3), and is preferably contained in a mixing amount of 6 to 7% by weight based on the total weight.

Furthermore, distilled water may be composed of one or more selected from the group consisting of primary distilled water, secondary distilled water, and tertiary distilled water, it is most preferable to use, as tertiary distilled water, ultrapure distilled water (tertiary distilled water) in which the conductivity value in water is 0.055 uS or less and contaminants (particles, ions, microorganisms, organic matter, etc.) are 100% removed, and distilled water is preferably contained in a mixing amount of 35 to 60% by weight based on the total weight.

Meanwhile, the coffee grounds are a by-product remaining after roasting and pulverizing coffee beans and then performing hydrolysis and heat treatment to extract a coffee liquid, and is waste of which 99.8% is discarded. Components such as proteins, fibers, sugars, polyphenol compounds, cellulose, hemicellulose, lignin, etc. remain in the coffee grounds. Tocopherol and polyphenolic and non-polyphenolic compounds that have not been extracted during the coffee hot water extraction process and Maillard reaction polymers that have been produced during the roasting process remain in the coffee grounds, and carbon, nitrogen, and silicon remain during carbonization.

Unless these coffee grounds are recycled, a large amount thereof is treated as industrial waste to cause environmental pollution. In Korea, coffee grounds are supplied as a boiler fuel source for coffee production plants, and some of them are used as animal feed, fertilizer additives, functional material source, biodiesel raw material, culture soil mixture for mushroom cultivation, and activated carbon. In the coffee industry, they are produced in large quantities in the process of making coffee food, and only an extremely small part is recycled in the composting process.

It is most preferable that coffee grounds in the present disclosure are coffee grounds (coffee by-product, coffee waste) collected from coffee shops, and the coffee grounds are preferably contained in a mixing amount of 3 to 19% by weight based on the total weight.

In addition, a water-soluble polymer may be composed of one or more selected from the group consisting of polyvinyl alcohol, starch, rubber, starch derivatives, cellulose derivatives, and nonionic water-soluble polymers, polyvinyl alcohol is preferable considering the synergistic action with other components, and the water-soluble polymer is preferably contained in a mixing amount of 0.1 to 0.5% by weight based on the total weight.

In addition, polyamic acid is preferably a hydrophilic polymer that can be used for the use of an emulsion stabilizer, a thickener, a film former, and an adhesive, and polyamic acid is preferably contained in a mixing amount of 1 to 1.5% by weight based on the total weight.

Furthermore, an anode active material to be mixed may be composed of one or more selected from the group consisting of natural graphite, artificial graphite, low crystalline carbon-based (soft/hard carbon) one, and a metal-based (silicon) one, natural graphite is preferable considering the synergistic action with other components, and the anode active material is preferably contained in a mixing amount of 10 to 15% by weight based on the total weight.

Finally, oil may be composed of one or more selected from the group consisting of vegetable oil, animal oil, fuel oil, solid oil, industrial oil, and lubricating oil, low-cost vegetable oil is preferable, and oil is preferably contained in a mixing amount of 7 to 8% by weight based on the total weight.

In addition, in order to solve the object of the present disclosure, the uniformly dispersed final mixed dispersion should be subjected to a heat treatment process before layers are generated by specific gravity, and the final mixed dispersion may obtain a silicon anode active material final product by performing heat treatment and carbonization processes in air at 600 to 900° C.

That is, as shown in FIG. 2, the method for preparing a silicon anode active material according to the present disclosure includes preparing two or more kinds of nano-silicon (A1) having a size of 20 to 100 nm, preparing an anionic surfactant (A2) and silane (A1) and then preparing ultrapure distilled water, which is tertiary distilled water as an aqueous solution for preparing a first mixed dispersion, firstly mixing A1, A2, and A3 with ultrapure distilled water as a starting process for preparing a silicon anode active material, and adding the anionic surfactant to the first mixed dispersion in order to mix the first mixed dispersion and coffee grounds (C1), and mixing and dispersing it.

As shown in FIG. 2, B1 to B7 are dispersed using an ultrasonic disperser to prepare a mixed dispersion, and additionally coffee grounds (C1), polyvinyl alcohol (C2), polyamic acid (C3), natural graphite (C4), vegetable oil (C5), etc. are mixed in order.

Here, B7 can obtain a silicon anode active material final product by primarily evaporating moisture from the sixth mixed dispersion at 300 to 380° C. and carbonizing it at 800 to 900° C. for 1 hour.

In the method for preparing a silicon anode active material of the present disclosure according to FIG. 1, the nano-silicon preparation step (S11) may be more preferably configured by including the steps of drying 20 nm silicon dioxide (CNVISION Co., Ltd.: CNSi-01) in a mixing amount of 1 to 0.68% by weight of the total 100% by weight of ultrapure distilled water at 100 to 130° C. to prepare it, drying 50 nm silicon carbide (AVENTION) in a mixing amount of 1 to 0.26% by weight of the total 100% by weight of ultrapure distilled water at 100 to 130° C. to prepare it, and drying silicon to remove moisture contained in silicon.

In the surfactant preparation step (S12), an anionic surfactant that lowers the surface tension by adsorbing an anion generated by dissociation in water on the surface of an aqueous solution is any one component of sodium lauryl ether sulfate, sodium α-olefin sulfonate, and alkyldimethylamine oxide, and may be used in a mixing amount of 1 to 7.5% by weight of the total 100% by weight of ultrapure distilled water.

In the silane preparation step (S13), alkoxysilane(methyltrimethoxysilane: (CH3O)3SiCH3) used to allow the inorganic surface to have hydrophobic properties may be used in a mixing amount of 1 to 6.25% by weight of the total 100% by weight of ultrapure distilled water.

In the mixed dispersion preparation step (S14), nano-silicon, an anionic surfactant, silane, coffee grounds, polyvinyl alcohol, polyamic acid, natural graphite, and vegetable oil may be mixed and dispersed in ultrapure distilled water (deionized water).

The coffee ground preparation step (S15) is a step of preparing the coffee grounds by drying coffee grounds collected from coffee shops at 130° C., and it is characterized in that there is no water washing process in the entire process from the collection to the anode active material final product since the coffee grounds are used in a mixing amount of 10 to 3.66% by weight of the total 100% by weight of ultrapure distilled water, and the coffee grounds used in the above process do not go through the activated carbonization process by performing heat treatment after the processes of immersing the coffee grounds in a hydroxide solution (potassium hydroxide: KOH, sodium hydroxide: NaOH, calcium hydroxide: $Ca(OH)_2$) in order to obtain a plurality of pores and removing the hydroxide solution from the coffee grounds.

In the polyvinyl alcohol mixing step (S21), polyvinyl alcohol described above may be mixed in an amount of 1 to 0.5% by weight of the total 100% by weight of an ultrapure distilled water mixed solution.

In the polyamic acid mixing step (S22), polyamic acid described above may be mixed in an amount of 1 to 1.37% by weight of the total 100% by weight of the ultrapure distilled water mixed solution.

In the graphite mixing step (S23), natural graphite (T-360: Xiamen TOB New Energy Technology Co., Ltd.) described above may be mixed in an amount of 1 to 15% by weight of the total 100% by weight of the ultrapure distilled water mixed solution.

In the vegetable oil mixing step (S24), vegetable oil described above may be mixed in an amount of 1 to 7.5% by weight of the total 100% by weight of the ultrapure distilled water mixed solution.

The final mixed dispersion heat treatment process step (S31) is the sixth mixed dispersion final heat treatment process, and may be configured by including the steps of primarily performing drying at 300 to 380° C. and secondly performing heat treatment at 800 to 900° C.

Further in the silicon active material obtaining step (S32), the aforementioned coffee grounds in which nano-silicon and graphite are mixed are pulverized with an automatic grinding mill and screened with an ultrasonic vibrating screen (160 #-96 μm) sieve so that a coffee ground nano-silicon anode active material composite capable of being used as an anode material may be obtained.

Anode and Anode Manufacturing Method

An anode according to the present disclosure includes the anode active material according to the present disclosure described above.

The anode according to the present disclosure may be manufactured by dissolving or dispersing the aforementioned anode active material according to the present disclosure, a conductive material, and/or a binder, etc. in a solvent to prepare an anode mixture, applying the anode mixture to at least one surface of an anode current collector, and then drying and compressing it, or may be manufactured by casting the anode mixture on a separate support and then laminating a film obtained by peeling it from the support on the anode current collector.

The anode current collector is not particularly limited as long as it has high conductivity while it does not cause chemical change in the battery. For example, copper, stainless steel, aluminum, nickel, titanium, fired carbon, a copper or stainless steel surface which is surface-treated with carbon, nickel, titanium, silver, or the like, an aluminum-cadmium alloy, and the like may be used. In addition, the anode current collector may have a thickness of typically 3 atm to 500 μm, and fine irregularities may be formed on the surface of the current collector to strengthen bonding force of the anode active material. For example, it may be used in various forms such as films, sheets, foils, nets, porous bodies, foams, and non-woven fabrics.

The anode active material may be contained in an amount of 80 to 99% by weight, more specifically, 85 to 98% by weight based on the total weight of the anode active material layer. When it is contained in the above-mentioned amount range, excellent capacity characteristics may be exhibited.

The conductive material is used to impart conductivity to the electrode, and in a battery to be configured, any material that does not cause chemical change and has electronic conductivity can be used without particular limitation. Specific examples thereof may include: graphite such as natural graphite or artificial graphite; carbon-based materials such as carbon black, acetylene black, Ketjenblack, channel black, furnace black, lamp black, thermal black, and carbon fiber; metal powders or metal fibers such as copper, nickel, aluminum, and silver; conductive whiskers such as zinc oxide and potassium titanate; conductive metal oxides such as titanium oxide; conductive polymers such as polyphenylene derivatives; or the like, and they may be used alone or in a mixture of two or more thereof. The conductive material may be contained in an amount of 1% by weight to 30% by weight based on the total weight of the anode active material layer.

In addition, the binder serves to improve the adhesion between anode active material particles and the adhesive strength between the anode active material and the current collector. Specific examples thereof may include polyvinylidene fluoride (PVDF), poly(vinylidene fluoride-co-hexafluoropropylene) (PVDF-co-HFP) copolymer, polyvinyl alcohol, polyacrylonitrile, carboxymethvicellulose (CMC), starch, hydroxypropyl cellulose, regenerated cellulose, polyvinylpyrrolidone, tetrafluoroethylene, polypropylene, polypropylene, ethylene-propylene-diene monomer (EPDM), sulfonated EPDM, styrene-butadiene rubber (SBR), fluororubber, various copolymers thereof, or the like, and they may be used alone or in a mixture of two or more thereof. The binder may be contained in an amount of 1% by weight to 30% by weight based on the total weight of the anode active material layer.

Meanwhile, the solvent used in preparing the anode mixture may be a solvent generally used in the art, and for example, dimethyl sulfoxide (DMSO), isopropyl alcohol, N-methylpyrrolidone (NMP), acetone, water, and the like may be used alone or in the form of a mixture thereof. The amount of the solvent used may be appropriately adjusted in consideration of the application thickness of the slurry, preparation yield, viscosity, and the like.

Lithium Secondary Battery

Next, the lithium secondary battery according to the present disclosure will be described.

The anode according to the present disclosure may be usefully used for manufacturing a lithium secondary battery.

Specifically, the lithium secondary battery according to the present disclosure includes an anode, a cathode positioned opposite to the anode, a separator interposed between the anode and the cathode, and an electrolyte, wherein the anode is an anode manufactured by applying the anode active material according to the present disclosure described above.

Meanwhile, the secondary battery may selectively further include a battery container accommodating an electrode assembly of the cathode, the anode, and the separator, and a sealing member sealing the battery container.

The lithium secondary battery may be manufactured according to a conventional secondary battery manufacturing method except for using the anode according to the present disclosure.

Hereinafter, preferred examples and comparative examples of the present disclosure will be separately described in more detail.

EXAMPLE 1

0.68% by weight of 20 nm silicon dioxide (CNVISION SiO2: CNSi-01) and 0.26% by weight of 50 nm silicon carbide (AVENTION SiC: silicon carbide) were dried to 130° C. and prepared, and then 7.5% by weight of an additional anionic surfactant portion and 6.25% by weight of silane are prepared.

Next, silicon dioxide, silicon carbide, a surfactant, and silane are sequentially put into 57.28% by weight of ultra-pure distilled water (deionized water), and then mixing and dispersion are performed for 30 minutes with an ultrasonic disperser (VCX-750) to prepare a first mixed dispersion.

An additional surfactant portion and 3.66% by weight of coffee grounds which are collected from coffee shops and dried at 1.30° C. are put into the first mixed dispersion and dispersed for 30 minutes with an ultrasonic disperser to prepare a second mixed dispersion.

In order to obtain a plurality of pores, the coffee grounds collected from coffee shops rather than the coffee grounds passing through an activated carbonization process by performing heat treatment after the processes of immersing the coffee grounds a hydroxide solution (potassium hydroxide: KOH, sodium hydroxide: NaOH, calcium hydroxide: Ca(OH)2) and removing the hydroxide solution from the coffee grounds were used as the coffee grounds, and there is no water washing process in the entire process from collecting the coffee grounds used in the above process to the anode active material final product.

After putting 0.5% by weight of polyvinyl alcohol into the second mixed dispersion, it is dispersed for 30 minutes with an ultrasonic disperser to prepare a third mixed dispersion.

After putting 1.37% by weight of polyamic acid into the third mixed dispersion, it is dispersed for 30 minutes with an ultrasonic disperser to prepare a fourth mixed dispersion.

After putting 15% by weight of natural graphite (T-360: Xiamen TOB New Energy Technology Co., Ltd.) into the fourth mixed dispersion, it is dispersed for 30 minutes with an ultrasonic disperser to prepare a fifth mixed dispersion.

After putting 7.5% by weight of a vegetable organic compound (Oil: vegetable oil) into the fifth mixed dispersion, it is dispersed for 30 minutes with an ultrasonic disperser to prepare a final sixth mixed dispersion.

As shown in FIG. 4, an anode active material in which nano-silicon is inserted into the coffee grounds may be obtained by heat-treating the sixth mixed dispersion at 900° C. to carbonize the coffee grounds.

The coffee grounds into which nano-silicon is inserted obtained through this process may be used as an anode active material without a waiter dashing process.

Coffee grounds in which nano-silicon and graphite are mixed are pulverized with an automatic grinding mill and selected to a size that would pass through an ultrasonic vibrating screen (160 #-96 μm) sieve to obtain a coffee ground nano-silicon anode active material composite that can be used as an anode material.

EXAMPLE 1-1

An anode active material was prepared in the same manner as in Example 1 above, but the following ball mill device was used during heat treatment of the sixth mixed dispersion.

At this time, an ultrasonic generator was added to the first plate portion (wall) where the balls (beads, etc.) collide with the dispersion inside the ball mill device to improve the dispersion capability. The ultrasonic generator may be configured inside the plate portion (wall), and a heating unit using a thermoelectric element may be additionally configured at the bottom thereof to directly heat the ball mill device to proceed with the heat treatment process together.

EXAMPLE 1-2

An anode active material was prepared in the same manner as in Example 1-1 above, but the following ball mill device was used during heat treatment of the sixth mixed dispersion.

In Example 1-1, the first plate portion where ultrasonic irradiation and ball mill dispersion are performed is directly heated by utilizing a thermoelectric element, in Example 1-2, there may be configured a passage unit which is provided with a second plate portion that has an air pump, an inlet, and a thermoelectric element inserted thereinto and is spaced apart from the plate portion, and in which heated air moves through a spaced space.

Accordingly, the air heated through the thermoelectric element uniformly heats the plate portion of the ball mill device in all directions so that the drying and heat treatment processes may be performed together with the ultrasonic ball mill dispersing process by using the above-mentioned configurations.

EXAMPLE 1-3

An anode active material was prepared in the same manner as in Example 1 or Examples 1-1 and 1-2 above, but the following high voltage pulse dispersion device was used in the step of preparing the second mixed dispersion.

That is, in the step of preparing the second mixed dispersion, when preparing the second mixed dispersion by mixing and dispersing the dried coffee grounds in the first mixed dispersion using a high voltage pulse dispersion device, an ultrasonic generator is additionally configured in the high voltage pulse dispersion device so that mass production may be expected by increasing the dispersion effect.

Such a high voltage pulse dispersion device continuously applies a high voltage charged from a capacitor to an electrode so that a silicon wire included in the high voltage pulse dispersion device causes an electric explosion in liquid, and through this, the silicon wire may be nano-powdered and dispersed.

At this time, it is preferable to put about 0.1 to 10 parts by weight of polyvinylpyrrolidone K-30 as a dispersant based on the nanopowder. In addition, a ball mill into which iron balls or iron vials are inserted may be used to remove a carbon film or silicon carbide of the formed silicon particles.

EXAMPLE 2

An anode active material was prepared in the same manner as in Example 1 above except that 7.32% by weight of coffee grounds, 1.36% by weight of $SiO_2$, 0.52% by weight of SiC, and 52.68% by weight of ultrapure distilled water were contained in Example 1 above.

EXAMPLE 3

An anode active material was prepared in the same manner as in Example 1 above except that 10.98% by weight of coffee grounds, 2.04% by weight of $SiO_2$, 0.78% by weight of SiC, and 48.08% by weight of ultrapure distilled water were contained in Example 1 above.

EXAMPLE 4

An anode active material was prepared in the same manner as in Example 1 above except that 14.64% by weight of coffee grounds, 2.72% by weight of $SiO_2$, 1.04% by weight of SiC, and 43.48% by weight of ultrapure distilled water were contained in Example 1 above.

EXAMPLE 5

An anode active material was prepared in the same manner as in Example 1 above except that 18.3% by weight of coffee grounds, 3.4% by weight of $SiO_2$, 1.3% by weight of SiC, and 33.88% by weight of ultrapure distilled water were contained in Example 1 above.

COMPARATIVE EXAMPLE 1

An anode active material was prepared in the same manner as in Example 1 above except that 0% by weight of coffee grounds, 3.4% by weight of $SiO_2$, 1.3% by weight of SiC, and 57.18% by weight of ultrapure distilled water were contained in Example 1 above.

COMPARATIVE EXAMPLE 2

An anode active material was prepared in the same manner as in Example 1 above except that 18.3% by weight of coffee grounds, 0% by weight of $SiO_2$, 1.3% by weight of SiC, and 42.28% by weight of ultrapure distilled water were contained in Example 1 above.

COMPARATIVE EXAMPLE 3

An anode active material was prepared in the same manner as in Example 1 above except that 18.3% by weight of coffee grounds, 3.4% by weight of $SiO_2$, 0% by weight of SiC, and 40.18% by weight of ultrapure distilled water were contained in Example 1 above.

The contents of each material for Examples 1 to 5 and Comparative Examples 1 to 3 are shown in Table 1 below.

TABLE 1

| | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| % by weight of coffee grounds | 3.66 | 7.32 | 10.98 | 14.64 | 18.3 | 0 | 18.3 | 18.3 |
| % by weight of $SiO_2$ | 0.68 | 1.36 | 2.04 | 2.72 | 3.4 | 3.4 | 0 | 3.4 |
| % by weight of SiC | 0.26 | 0.52 | 0.78 | 1.04 | 1.3 | 1.3 | 1.3 | 0 |

Manufacturing Example—Manufacturing of Lithium Secondary Batteries Containing Silicon Anode Active Materials in Which Nano-silicon Mixtures are Inserted Into the Pores of Coffee Grounds Full cells (65 mm×50 mm 5 T) were fabricated with anode active materials obtained mixing materials according to Examples and Comparative Examples above, and the data was measured. An electrode was used as the anode according to the present disclosure, the electrode manufactured by preparing an anode slurry using a silicon anode active material in which nano-silicon is inserted into the pores of the coffee grounds, artificial Graphite (MCMB: mesocarbon microbeads), acetylene black, carboxymethyl cellulose (CMC), and styrene-butadiene rubber (SBR) at a mixing ratio of 15:79:2:2:2% by weight, coating the anode slurry to a thickness of 180 μm on an anode current collector with a slot die coating machine of Xiamen TOB New Energy Technology Co., Ltd., and then drying it for 6 hours under vacuum drying conditions of 130° C.

An electrode was used as the cathode, the electrode manufactured by preparing a cathode slurry using NMC811 ($LiNi_{0.6}Mn_{0.1}Co_{0.1}O_2$), acetylene black: and polyvinylidene fluoride (PVDF) at a mixing ratio of 96:2:2% by weight, coating the cathode slurry to a thickness of 250 μm on a cathode current collector with a slot die coating machine of Xiamen TOB New Energy Technology Co., Ltd., and then drying it for 6 hours under vacuum drying conditions of 130° C.

The full cells were assembled within an argon-filled glove box.

The full cells were fabricated by using, as the electrolyte, an electrolyte containing 1M of lithium hexafluorophosphate ($LiPF_6$) and having ethylene carbonate (EC), dimethyl carbonate (DMC), and diethyl carbonate (DEC) mixed therein at a volume ratio of 1:1:1, and applying a wet separator as the separator.

Experimental Example—Evaluation of Electrochemical Properties

The full cells fabricated in Manufacturing Example were charged to 4.2 V and discharged until it became 2.8 V to measure the charge capacities (mAh/q), discharge capacities (mAh/g), and initial charge/discharge efficiencies (%).

In addition, the 50 cycle characteristics of the full cell fabricated for each sample in Manufacturing Example above were obtained.

The charge and discharge capacities and charge/discharge efficiencies mentioned above are shown in Table 2 below.

TABLE 2

| | Initial charge capacity (mAh/g) | Initial discharge capacity (mAh/g) | Initial charge/discharge efficiency (%) |
|---|---|---|---|
| Ex. 1 | 288.5 | 287.3 | 99.58 |
| Ex. 2 | 278.5 | 276.5 | 99.28 |
| Ex. 3 | 248.3 | 246.2 | 99.15 |
| Ex. 4 | 249.5 | 247.1 | 99.03 |
| Ex. 5 | 243.1 | 241.3 | 99.25 |
| Com. Ex. 1 | 256.7 | 255.2 | 99.41 |
| Com. Ex. 2 | 252.9 | 251.2 | 99.32 |
| Com. Ex. 3 | 231.4 | 230.9 | 99.78 |

FIGS. 7 and 8 are graphs showing 50 cycle charge/discharge measurement results of batteries having silicon anode active materials for lithium secondary batteries in which nano-silicon is inserted into coffee grounds applied thereto, and as the measurement results, it can be seen that the mixing amount of Example 1 shows the most excellent charge/discharge cycle characteristics. There have conventionally been disadvantages in that, when nano-silicon is applied as an anode active material, volume expansion occurs due to charging and discharging, and accordingly, the capacities are decreased. However, in order to prevent volume expansion, the present disclosure may allow nano-silicon to be inserted into the pores of the coffee grounds to control expansion of nano-silicon as much as possible, and may prepare the anode active material using coffee grounds, which are an environmental pollutant, to protect the environment and reduce the preparation cost. In particular, water pollution problems in the preparation process may be prevented without a water washing process in the entire process of the anode active material.

Detailed descriptions of preferred embodiments of the present disclosure disclosed as described above have been provided so that those skilled in the art can implement and practice the present disclosure. Although the descriptions have been described with reference to the preferred embodiments of the present disclosure, those skilled in the art will be able to understand that the present disclosure can be variously modified and changed within a range that does not depart from the scope of the present disclosure. For example, those skilled in the art can use each of configurations described in the above-described embodiments in a manner of combining them with each other. Thus, the present disclosure is not intended to be limited to the embodiments shown herein but is about to impart the widest scope consistent with the principles and novel features disclosed herein.

The present disclosure may be embodied in other specific forms in a range that does not depart from the spirit and essential characteristics of the present disclosure. Accordingly, the above detailed descriptions should not be construed as limiting in all respects and should be considered as illustrative. The scope of the present disclosure should be determined by reasonable interpretation of the appended claims, and all changes within the equivalent scope of the present disclosure are included in the scope of the present disclosure. The present disclosure is not intended to be limited to the embodiments shown herein but is about to impart the widest scope consistent with the principles and novel features disclosed herein. In addition, claims that do not have an explicit citation relationship in the claims may be combined to form an embodiment or may be included as new claims by amendment after filing.

INDUSTRIAL APPLICABILITY

The method for preparing a silicon anode active material in which a nano-silicon mixture is inserted into pores of coffee grounds, which is the present disclosure, has industrial applicability since it can contribute to the protection of the natural environment through the preparation of a High-capacity silicon anode active material for a lithium secondary battery, which is prepared using coffee grounds that are an environmental pollutant, and can lower the preparation cost of a Lithium secondary battery anode material with the high-capacity silicon anode active material using coffee grounds.

What is claimed is:

1. A method comprising the steps of:

a) preparing nano-silicon;

b) preparing an anionic surfactant;
c) preparing silane;
d) preparing a first mixed dispersion by mixing and dispersing the nano-silicon, the anionic surfactant, and the silane in tertiary distilled water;
e) preparing a second mixed dispersion by mixing and dispersing dried coffee grounds in the first mixed dispersion;
f) preparing a third mixed dispersion by mixing and dispersing polyvinyl alcohol in the second mixed dispersion;
g) preparing a fourth mixed dispersion by mixing and dispersing polyamic acid in the third mixed dispersion;
h) preparing a fifth mixed dispersion by mixing and dispersing graphite in the fourth mixed dispersion;
i) preparing a sixth mixed dispersion by mixing and dispersing a vegetable oil in the fifth mixed dispersion;
j) heat-treating the sixth mixed dispersion to cause the nano-silicon to be inserted into pores of the coffee grounds and to carbonize a mixture of the coffee grounds and the nano-silicon; and
k) pulverizing the carbonized mixture of the coffee grounds and the nano-silicon and selecting and obtaining a portion of the pulverized carbonized mixture using an ultrasonic vibrating screen to obtain a silicon anode active material.

2. The method of claim 1, wherein the step e) is preparing the second mixed dispersion by mixing and dispersing the dried coffee grounds in the first mixed dispersion using a high voltage pulse dispersion device, and the step j) is a step of heat-treating the sixth mixed dispersion using a ball mill device.

3. The method of claim 2, wherein the high voltage pulse dispersion device of the step e) continuously applies a high voltage charged from a capacitor to an electrode so that a silicon wire included in the high voltage pulse dispersion device causes an electric explosion in a liquid, and through this, the silicon wire included in the high voltage pulse dispersion device is nano-powdered and dispersed, the high voltage pulse dispersion device has an ultrasonic generator additionally configured therein to increase a dispersion effect, and the step e) is additionally putting polyvinylpyrrolidone as a dispersant to increase the dispersion effect.

4. The method of claim 2, wherein the ball mill device of the step j) includes an ultrasonic generator added to a first plate portion forming a space inner wall where balls and a dispersion collide, and a heating unit including a thermoelectric element is provided on a bottom of the first plate portion so that dispersion and heat treatment processes are proceeded together.

5. The method of claim 2, wherein the ball mill device of the step j) further includes a first plate portion forming a space inner wall where balls and a dispersion collide, and a second plate portion spaced apart from the first plate portion and configured so that an air pump, an inlet, and a thermoelectric element are inserted into the second plate portion, and a passage unit through which heated air moves is provided in a separated space between the first plate portion and the second plate portion, thereby uniformly heating the ball mill device.

6. The method of claim 1, wherein the step a) includes the steps of:
a-1) preparing silicon dioxide by drying a mixture in an amount of 1 to 0.68% by weight of the total 100% by weight of tertiary distilled water at 100 to 130° C.;
a-2) preparing silicon carbide by drying a mixture in an amount of 1 to 0.26% by weight of the total 100% by weight of the tertiary distilled water at 100 to 130° C.; and
a-3) drying the silicon to remove moisture contained in the silicon.

7. The method of claim 1, wherein the step b) is characterized in that the anionic surfactant in which anions generated by dissociation in water are adsorbed on surface of an aqueous solution to lower a surface tension is any one component of sodium lauryl ether sulfate, sodium α-olefin sulfonate, and alkyldimethylamine oxide, and is used in a mixing amount of 1 to 7.5% by weight of the total 100% by weight of the tertiary distilled water.

8. The method of claim 1, wherein the step c) is using methyltrimethoxysilane: (CH3O)3SiCH3 to allow an inorganic surface to have hydrophobic properties in a mixing amount of 1 to 6.25% by weight of the total 100% by weight of tertiary distilled water.

9. The method of claim 1, wherein the step f) is mixing the polyvinyl alcohol in an amount of 1 to 0.5% by weight of the total 100% by weight of the tertiary distilled water.

10. The method of claim 9, wherein the step h) is characterized in that the graphite is natural graphite, and is mixed in an amount of 1 to 15% by weight of the total 100% by weight of the tertiary distilled water.

11. The method of claim 1, wherein the step g) is mixing the polyamic acid in an amount of 1 to 1.37% by weight of the total 100% by weight of the tertiary distilled water.

12. The method of claim 1, wherein the step i) is mixing the vegetable oil in an amount of 1 to 7.5% by weight of the total 100% by weight of the tertiary distilled water.

13. The method of claim 1, wherein the step j) is a sixth mixed dispersion final heat treatment process, and includes the steps of:
j-1) primarily performing drying at 300 to 380° C.; and
j-2) secondly performing heat treatment at 800 to 900° C.

14. The method of claim 1, wherein, in step k), the carbonized mixture of the coffee grounds and the nano-silicon is pulverized with an automatic grinding mill and screened using an ultrasonic vibrating screen sieve so that the silicon anode active material is obtained.

* * * * *